United States Patent
Deshpande et al.

(10) Patent No.: US 11,659,208 B2
(45) Date of Patent: May 23, 2023

(54) SYSTEMS AND METHODS FOR SIGNALING LEVEL INFORMATION IN VIDEO CODING

(71) Applicant: Sharp Kabushiki Kaisha, Sakai (JP)

(72) Inventors: Sachin G. Deshpande, Vancouver, WA (US); Jonatan Samuelsson, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/482,671

(22) Filed: Sep. 23, 2021

(65) Prior Publication Data

US 2022/0014788 A1     Jan. 13, 2022

Related U.S. Application Data

(63) Continuation of application No. 17/010,878, filed on Sep. 3, 2020, now Pat. No. 11,172,232.

(60) Provisional application No. 62/897,149, filed on Sep. 6, 2019.

(51) Int. Cl.
*H04N 19/70*     (2014.01)
*H04N 19/174*     (2014.01)
*H04N 19/136*     (2014.01)

(52) U.S. Cl.
CPC ........... *H04N 19/70* (2014.11); *H04N 19/136* (2014.11); *H04N 19/174* (2014.11)

(58) Field of Classification Search
CPC ............................. H04N 19/70; H04N 19/136
See application file for complete search history.

(56) References Cited

U.S. PATENT DOCUMENTS

| | | | |
|---|---|---|---|
| 2019/0268565 A1* | 8/2019 | Tsukagoshi | H04N 21/4345 |
| 2020/0344499 A1* | 10/2020 | Fang | H04N 21/816 |
| 2021/0360268 A1* | 11/2021 | Drugeon | H04N 19/31 |

OTHER PUBLICATIONS

Brass et al. (Versatile Video Coding (Draft 5), Joint Video Experts Team (JVET) of ITU-T SG 16 WP 3 and ISO/IEC JTC 1/SC 29/WG 11 14th Meeting: Geneva, CH, (Mar. 19-27, 2019).*
Deshpande et al., "Systems and Methods for Signaling Level Information in Video Coding", U.S. Appl. No. 17/010,878, filed Sep. 3, 2020.

* cited by examiner

*Primary Examiner* — Fabio S Lima
(74) *Attorney, Agent, or Firm* — Keating & Bennett, LLP

(57) ABSTRACT

A device may be configured to signal level information according to one or more of the techniques described herein.

2 Claims, 6 Drawing Sheets

SYSTEMS AND METHODS FOR SIGNALING LEVEL INFORMATION IN VIDEO CODING

TECHNICAL FIELD

This disclosure relates to video coding and more particularly to techniques for signaling level information for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/VVG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, Calif. From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, Calif., document JVET-J1001-v2, which is incorporated by reference herein, and referred to as JVET-J1001. The current development of a next generation video coding standard by the VCEG and MPEG is referred to as the Versatile Video Coding (WC) project. "Versatile Video Coding (Draft 6)," 15th Meeting of ISO/IEC JTC1/SC29/WG11 3-12 Jul. 2019, Gothenburg, SE, document JVET-O2001-vE, which is incorporated by reference herein, and referred to as JVET-O2001, represents the current iteration of the draft text of a video coding specification corresponding to the WC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of signaling level information for video data, the method comprising: signaling a first syntax element indicating a profile; signaling a second syntax element indicating a context; signaling a third syntax element indicating a level; sending a profile tier level syntax structure including the first syntax element, second syntax element and third syntax element, wherein the first syntax element, the second syntax element and the third syntax element are located on a top of the profile tier level syntax structure, and wherein the third syntax element immediately follows the second syntax element.

In one example, a method of decoding video data, the method comprising: receiving a profile tier level syntax structure; parsing a first syntax element, from the profile tier level syntax structure, indicating a profile; parsing a second syntax element, from the profile tier level syntax structure, indicating a context; and parsing a third syntax element, from the profile tier level syntax structure, indicating a level, wherein the first syntax element, the second syntax element and the third syntax element are located on a top of the profile tier level syntax structure, and wherein the third syntax element immediately follows the second syntax element.

In one example, a device of decoding video data, the device comprising one or more processors configured to: receive a profile tier level syntax structure; parse a first syntax element, from the profile tier level syntax structure, indicating a profile; parse a second syntax element, from the profile tier level syntax structure, indicating a context; and parse a third syntax element, from the profile tier level syntax structure, indicating a level, wherein the first syntax element, the second syntax element and the third syntax element are located on a top of the profile tier level syntax structure, and wherein the third syntax element immediately follows the second syntax element.

DESCRIPTION OF EMBODIMENTS

Figure 1:
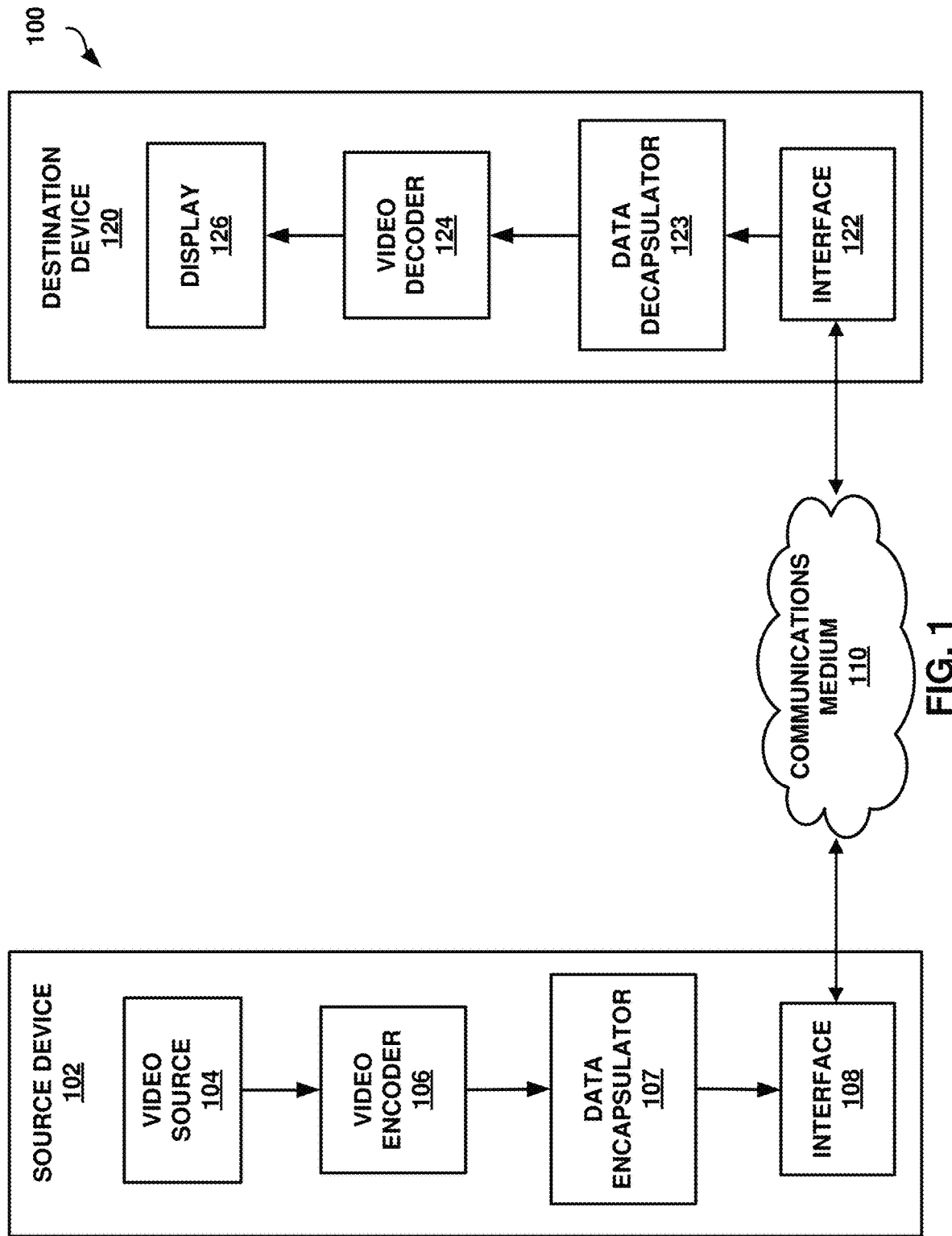
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling level information for coded video data. It should be noted that although techniques of this disclosure are described with respect to ITU-T H.264, ITU-T H.265, JEM, and JVET-O2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-O2001. Thus, reference to ITU-T H.264, ITU-T H.265, JEM, and/or JVET-O2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device comprises one or more processors configured to signal a syntax element indicating a profile corresponding to a coded video sequence, signal a syntax element indicating a context corresponding to the coded video sequence, and signal a syntax element indicating a level corresponding to the coded video sequence, wherein the syntax element indicating the level immediately follows the syntax element indicating the context.

In one example, a non-transitory computer-readable storage medium comprises instructions stored thereon that, when executed, cause one or more processors of a device to signal a syntax element indicating a profile corresponding to a coded video sequence, signal a syntax element indicating a context corresponding to the coded video sequence, and signal a syntax element indicating a level corresponding to the coded video sequence, wherein the syntax element indicating the level immediately follows the syntax element indicating the context.

In one example, an apparatus comprises means for signaling a syntax element indicating a profile corresponding to a coded video sequence, means for signaling a syntax element indicating a context corresponding to the coded video sequence, and means for signaling a syntax element indicating a level corresponding to the coded video sequence, wherein the syntax element indicating the level immediately follows the syntax element indicating the context.

In one example, a device comprises one or more processors configured to parse a syntax element indicating a profile corresponding to a coded video sequence, parse a syntax element indicating a context corresponding to the coded video sequence, and parse a syntax element indicating a level corresponding to the coded video sequence, wherein the syntax element indicating the level immediately follows the syntax element indicating the context.

In one example, a non-transitory computer-readable storage medium comprises instructions stored thereon that, when executed, cause one or more processors of a device to parse a syntax element indicating a profile corresponding to a coded video sequence, parse a syntax element indicating a context corresponding to the coded video sequence, and parse a syntax element indicating a level corresponding to the coded video sequence, wherein the syntax element indicating the level immediately follows the syntax element indicating the context.

In one example, an apparatus comprises means for parsing a syntax element indicating a profile corresponding to a coded video sequence, means for parsing a syntax element indicating a context corresponding to the coded video sequence, and means for parsing a syntax element indicating a level corresponding to the coded video sequence, wherein the syntax element indicating the level immediately follows the syntax element indicating the context.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may be divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-O2001, CTUs are partitioned according a quadtree plus multi-type tree (QTMT or QT+MTT) structure. The QTMT in JVET-O2001 is similar to the QTBT in JEM. However, in JVET-O2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

Figure 2:
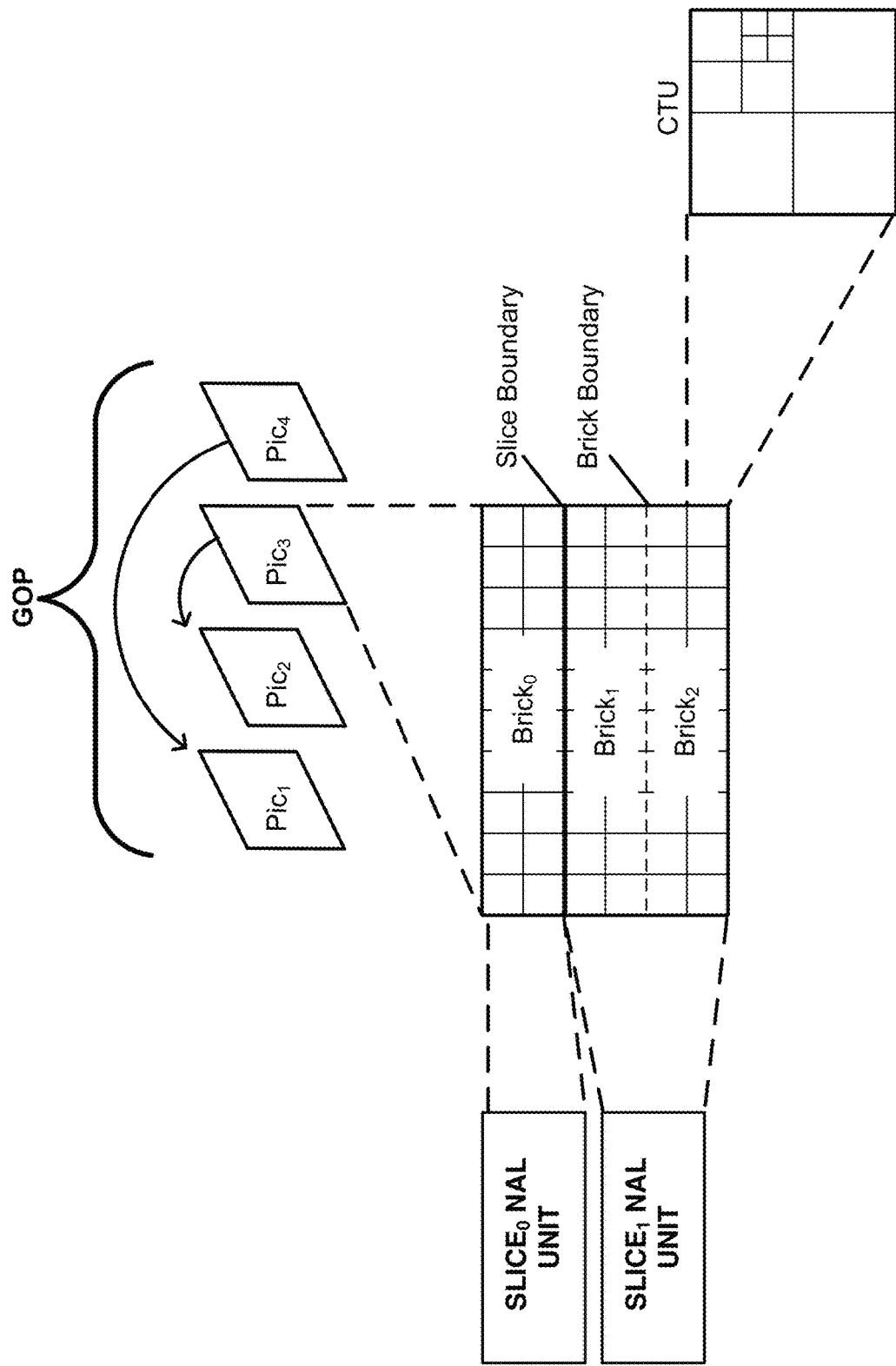
FIG. 2 is a conceptual diagram illustrating coded video data and corresponding data structures according to one or more techniques of this disclosure.

With respect to JVET-O2001, slices are required to consist of an integer number of bricks instead of only being required to consist of an integer number of CTUs. In JVET-O2001, a brick is a rectangular region of CTU rows within a particular tile in a picture. Further, in JVET-O2001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 2 is a conceptual diagram illustrating an example of a group of pictures including slices. In the example illustrated in FIG. 2, Pica is illustrated as including two slices (i.e., $Slice_0$ and $Slice_1$). In the example illustrated in FIG. 2, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., MVO, a vertical displacement component of the motion vector (i.e., MVO, and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_3$ is illustrated as referencing $Pic_2$. Similarly, $Pic_4$ is illustrated as referencing $Pic_1$. With respect to FIG. 2 assuming the picture number corresponds to the decoding order the DPB would be populated as follows: after decoding $Pic_1$, the DPB would include $\{Pic_a\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_a\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-O2001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

[Object 1]
With respect to the equation's used herein She following arithmetic operators, may be used:
+ Addition
− Subtraction
* Multiplication, including matrix multiplication
$x^y$ Exponentiation Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote in mathematical equations where no truncation or rounding is intended.

[Object 2]
Further, the following mathematical functions may be used:
Log 2(x) the base-2 logarithm of x;

$$Min(x, y) = \begin{cases} x & ; x <= y \\ y & ; x > y \end{cases};$$

$$Max(x, y) = \begin{cases} x & ; x >= y \\ y & ; x < y \end{cases}$$

Ceil(x) the smallest integer greater than or equal to x.

[Object 3]
With respect to tire example syntax used herein, the following definitions of logical operators may be applied:
x && y Boolean logical "and" of x and y
x||y Boolean logical "or" of x and y
! Boolean logical "not"
x?y: z If x is TRUE or not equal to 0, evaluates to the value of y, otherwise, evaluates to the value of z.

[Object 4]
Further, the following relational operators may be applied.
> Greater than
>= Greater than or equal to
< Less than
<= Less than or equal to
== Equal to
!= Not equal to

[Object 5]
Further, is should be rioted shat m the syntax descriptors used herein, the following descriptor's may be applied
b(8): byte haring any pattern of bit string (8 bits). The parsing process for this descriptor is specified by the return value of the function read_bits(8).
f(n) fixed-pattern bit siring using n bits written (from left to right) with the left bis first. The parsing process for this descriptor is specified by the return value of the function read_bits(n)

se(v): signed integer 0-th order Exp-Golomb-coded syntax element with the left bit first tb(v): truncated binary using up to maxVal bits with maxVal defined in die semantics of the symtax element.

tn(v): truncated unary using up to maxVal bits with maxVal defined in the semantics of die symtax element.

u(n) unsigned integer using n bits. When n is "v" in the syntax table, the number of bits varies in a manner dependent on the value of other syntax elements. The passing process for this descriptor is specified by the return value of the function read_bits(n) interpreted as a binary representation of an unsigned integer with most significant bit written first.

ue(t): unsigned integer 0-th order Exp-Golomb-coded syntax element with the left bit first.

As described above, video content includes video sequences comprised of a series of frames (or pictures) and each video frame or picture may be divided into one or more regions. A coded video sequence (CVS) may be encapsulated (or structured) as a sequence of access units, where each access unit includes video data structured as network abstraction layer (NAL) units. It should be noted that in some cases, an access unit may be required to contain exactly one coded picture. A bitstream may be described as including a sequence of NAL units forming one or more CVSs. It should be noted that multi-layer extensions enable a video presentation to include a base layer and one or more additional enhancement layers. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. Each NAL unit may include an identifier indicating a layer of video data the NAL unit is associated with. It should be noted that sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation). Layers may also be coded independent of each other. In this case, there may not be an inter-layer prediction between two layers.

Referring to the example illustrated in FIG. 2, each slice of video data included in Pica (i.e., $Slice_0$ and $Slice_1$) is illustrated as being encapsulated in a NAL unit. In JVET-O2001, each of a video sequence, a GOP, a picture, a slice, and CTU may be associated with metadata that describes video coding properties. JVET-O2001 defines parameters sets that may be used to describe video data and/or video coding properties. In particular, JVET-O2001 includes the following five types of parameter sets: decoding parameter set (DPS), video parameter set (VPS), sequence parameter set (SPS), picture parameter set (PPS), and adaption parameter set (APS). In JVET-O2001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-O2001 enables supplemental enhancement information (SEI) messages to be signaled. In JVET-O2001, SEI messages assist in processes related to decoding, display or other purposes, however, SEI messages may not be required for constructing the luma or chroma samples by the decoding process. In JVET-O2001, SEI messages may be signaled in a bitstream using non-VCL NAL units. Further, SEI messages may be conveyed by some means other than by being present in the bitstream (i.e., signaled out-of-band).

[Object 6]

An access unit may be called a layer access unit. As described above, multi-layer extensions enable a video presentation to include a base layer and one or more additional enhancement layers. It should be noted that in ITU-T H.265 a temporal true subset of a scalable layer is not referred to as a layer but referred to as a sub-layer or temporal sub-layer. That is, ITU-T H.26S protides the following definition with respect to sub-layers:

sub-layer A temporal scalable layer of a temporal scalable bitstream, consisting of VCL NAL units with a particular value of the TemporalId variable and the associated non-VCL NAL units

[Object 7]

It should be noted that JVET-O2001 provides the following definitions with respect to sub-layers.

sub-layer: A temporal scalable layer of a temporal scalable bitstream, consisting of VCL NAL units with a particular value of the TemporalId variable and the associated non-VCL NAL units.

sub-layer representation: A subset of the bitstream consisting of NAL units of a particular sub-laser and the lower sub-layers.

It should be noted that, in general, the terms temporal sub-layer, sub-layer and sub-layer representation may be used interchangeably.

Figure 3:
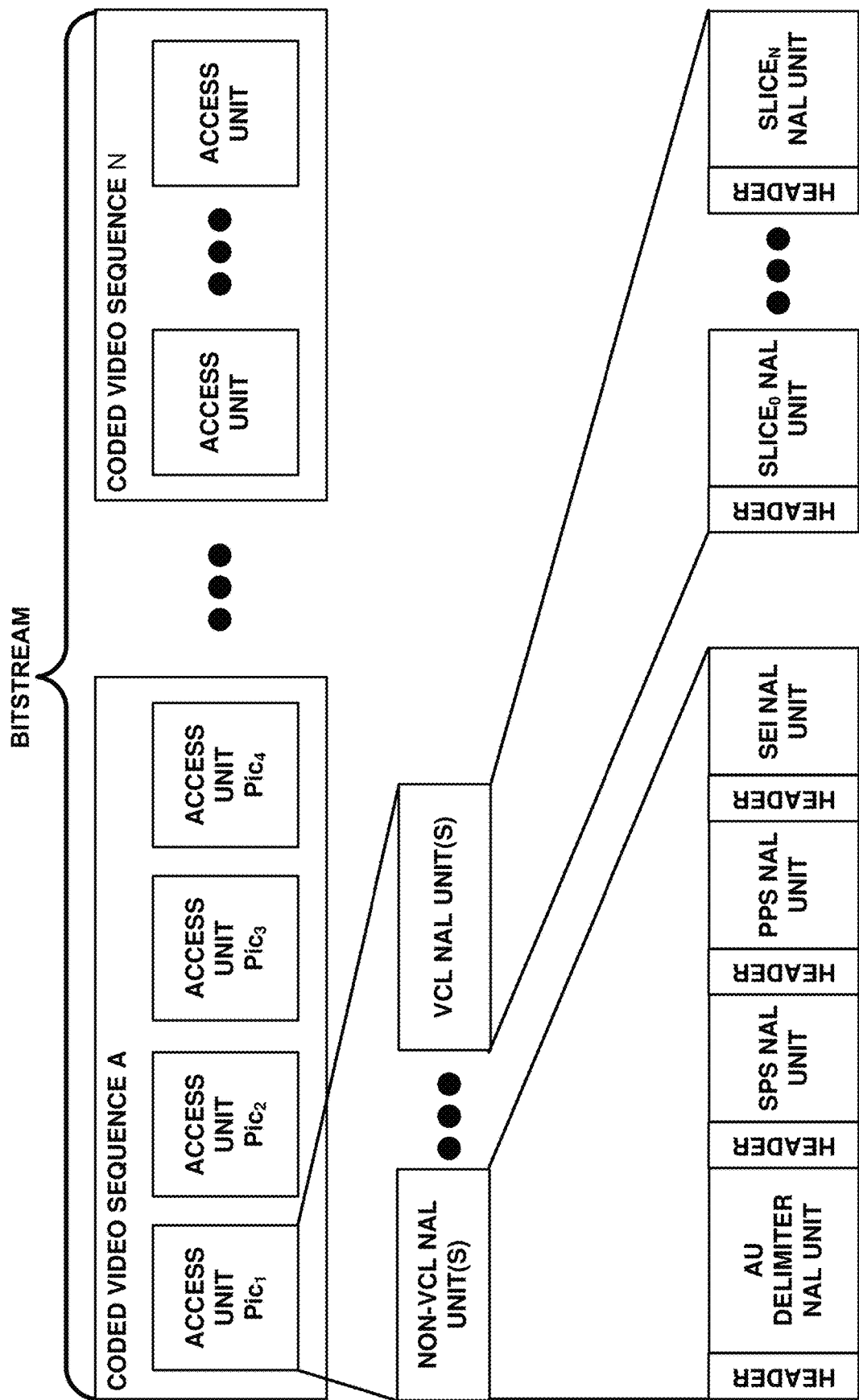
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS is represented by NAL units included in a respective access unit. In the example illustrated in FIG. 3, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 3, HEADER is a NAL unit header. JVET-O2001 defines NAL unit header semantics that specify the type of Raw Byte Sequence Payload (RBSP) data structure included in the NAL unit.

[Object 8]

As described above, JVET-O2001 includes, a decoding parameter set (DPS) and an Sequence Parameter Set (SPS) In JVET-O2001, the DPS and SPS include a syntax structure, called profile_tier_level( ), for indicating the capabilities required to decode the Coded Video Sequence. The profile_tier_level( ) syntax structure includes the general profile her and level of the Coded Video Sequence and may also include information about sub-profiles and sub-layer levels. As provided below, through a syntax element called num_sub_profiles, it is possible to indicate hew many sub-profiles will be signaled. For each such signaled sub-profile, there is a 32-bit long syntax element indicating the value of that sub-profile. As provided below, in JVET-O2001, an 8-bit value is signaled for num_ sub_profiles with no further constraints on the value range, resulting in an implicit value range of 0 to 255 inclusive.

[Object 9]

Table 1 illustrates the syntax of the DPS provided in JVET-O2001.

TABLE 1

|  | Descriptor |
| --- | --- |
| decoding_parameter_set_rbsp( ) { |  |
|   dps_decoding_parameter_set_id | u(4) |
|   dps_max_sub_layers_minus1 | u(3) |
|   dps_reserved_zero_bit | u(1) |
|   profile_tier_level( dps_max_sub_layers_minus1 ) |  |
|   dps_extension_flag | u(1) |
|   if( dps_extension_flag ) |  |
|     while( more_rbsp_data( ) ) |  |
|       dps_extension_data_flag | u(1) |
|   rbsp_trailing_bits( ) |  |
| } |  |

[Object 10]

With respect to Table 1. JVET-O200 provides the following semantics:

A DPS RBSP shall be available to the decoding process prior to it being referred, included in at least one access unit with TemporalId equal to 0 or provided through external means, said the DPS NAL unis containing die DPS RBSP shall have nuh_layer_id equal so the nuh_layer_id of the SPS NAL unit that refers to it.

NOTE—DPS NAL units are required to be available to the decoding process prior to their being referred (either in die bitstream or by external means). However, the DPS RBSP contains information that is not necessary for operation of die decoding process specified in clauses 2 through 10 of tins Specification.

dps_decoding_parameter_set_id identifies die DPS for reference by other syntax elements. The value of dps_decoding_parameter_set_id shall not be equal to 0.

dps_max_sub_layers_minus1 plus 1 specifies the maximum number of temporal sub-layers, that may be present in each CVS referring to the DPS. The value of dps_max_sub_layers_minus1 shall be in the range of 0 to 6, inclusive.

dps_reserved_zero_bit shall be equal to 0 in bitstreams conforming to this version of tins Specification. The value 0 tor dps_reserved_zero_bit is reserved for future use by ITU-T|TSO/IEC.

[Object 11]

dps_extension_flag equal to 0 specifies that no dps_extension_data_flag_syntax elements are present in the DPS RBSP syntax structure. dps_extension_flag equal to 1 specifics that there are dps_extension_data_flag syntax elements present in the DPS RBSP syntax structure.

dps_extension_data_flag may have any value. Its presence and value do trot affect decoder conformance to profiles specified in Annex A. Decoders conforming to tins version of this Specification shall ignore all dps_extension_data_flag syntax elements

[Object 12]

As illustrated in Table 1, the DPS provided in JVET-O2001 includes die profile_tier_level( ) syntax structure. Tire profile_tier_level( ) syntax structure is described in further detail below. In JVET-O2001 the a Sequence parameter set (SPS) also includes the profile_tier_level( ) syntax structure Table 3 illustrates the relevant portion of the syntax structure of the SPS provided in TVBT-O2001 including the profile_tier_level( ) syntax structure

TABLE 3

|  | Descriptor |
| --- | --- |
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
| ... |  |
| } |  |

[Object 13]

With respect to Table 3, JVET-O2001 provides the following semantics:

An SPS RBSP shall be available to the decoding process prior to it being referred, included in at least one access unit with TemporalId equal to 0 or provided through external means, and the SPS NAL unit containing the SPS RBSP shall have muh_layer_id equal to the nuh_layer_id of PPS NAL unit that refers to it.

All SPS NAL units with a particular value of sps_seq_parameter_set_id us a CVS shall have the same content.

sps_decoding_parameter_set_id, when greater than 0, specifies site value of dps_decoding_parameter_set_id for the DPS referred to by the SPS. When sps_decoding_parameter_set_id is equal to 0 the SPS does not refer to a DPS and no DPS is referred to when decoding each CVS referring to the SPS. The value of sps_decoding_parameter_set_id shall be the same in all SPSs that are referred to by coded pictures in a bitstream.

sps_video_parameter_set_id, when greater than 0, specifies the value of vps_video_parameter_set_id for the VPS referred to by the SPS. When sps_video_parameter_set_id is equal to 0, the SPS does not refer to a VPS and no VPS is referred to when decoding each CVS referring to the SPS sps_max_sub_layers_minus1 plus 1 specifies the maximum number of temporal sub-layers that may be present in each CVS referring to the SPS. The value of sps_max_sub_layers_minus1 shall be in the range of 0 to 6, inclusive.

[Object 14]

sps_reserved_zero_5bits shall be equal to 0 in bitstreams conforming to tins version of this Specification. Other values for sps_reserved_zero_5bits are reserved for future use by ITU-T|ISO/TEC.

[Object 15]

Table 4 illustrates the profile_tier_level( ) syntax structure provided in JVET-O2001.

TABLE 4

|  | Descriptor |
| --- | --- |
| profile_tier_level( sps_max_sub_layers_minus1 ) { |  |
|   general_profile_idc | u(7) |
|   general_tier_flag | u(1) |
|   num_sub_profiles | u(8) |
|   for( i = 0; 1 <= num_sub_profiles; i++ ) |  |
|     general_sub_profiles_idc[ i ] | u(32) |
|   general_constraint_info( ) |  |
|   general_level_idc | u(8) |
|   for( i = 0; i < maxNumSubLayersMinus1; i++ ) |  |
|     sub_layer_level_present_flag[ i ] | u(1) |

TABLE 4-continued

| | Descriptor |
|---|---|
| while( !byte_aligned( ) ) | |
|   ptl_alignment_zero_bit | f(1) |
| for( i = 0; i < maxNumSubLayersMinus1; i++ ) | |
|   if( sub_layer_level_present_flag[ i ] ) | |
|     sub_layer_level_idc[ i ] | u(8) |
| } | |

[Object 16]
JVET-O2001 provides the following definitions for the respective syntax elements illustrated in Table 4.

When tire profile_tier_level( ) structure is included in a DPS, the BitstreamInScope is the entire bitstream that refers to the DPS. When the profile_tier_level( ) structure is included in an SPS, the BitstreamInScope is the CVS that refers to the SPS.

general_profile_idc indicates s profile to which BitstreamInScope conforms as specified in Annex A Bitstreams shall not contain values of general_profile_idc other than those specified in Annex A. Other values of general_profile_idc are reserved for future use by ITU-T|ISO/TEC.

general_tier_flag specifies the tier context for the interpretation of general_level_idc as specified in Annex A.

num_sub_profiles specifies the number of the general_sub_profile_idc[i] syntax elements.

general_sub_profile_idc[i] Indicates the i-th interoperability metadata registered as specified by X Recommendation ITU-T T.35, the contents of winch are not specified in this Specification

[Object 17]
general_level_idc indicate a level to which BitstreamInScope conforms as specified in Annex A. Bitstreams shall nor contain values of general_level_idc other than those specified in Annex A. Other values of general_level_idc are reserved for future use by ITU-T|ISO/IEC.

NOTE—A greater value of general_level_idc indicates a higher level. The maximum level signalled in the DPS for BitstreamInScope may be higher than the level signalled in the SPS for a CVS contained within BitstreamInScope.

NOTE—When BitstreamInScope conforms to multiple profiles general_profile_idc should indicate the profile that provides the preferred decoded result or the preferred bitstream identification, as determined by the encoder (in a manner not specified in this Specification)

NOTE—When the profile_tier_level( ) syntax structure is included in a DPS and CVSs of BitstreamInScope conform to different profiles, general_profile_idc and level_idc should indicate the profile and level for a decoder that is capable of decoding BitstreamInScope.

sub_layer_level_present_flag[i] equal to 1 specifies that level information is present in the profile_tier_level( ) syntax structure for die sub-layer representation with TemporalId equal to i. sub_layer_level_present_flag[i] equal to 0 specifies that level information is not present in the profile_tier_level( ) syntax structure for the sub-layer representation with TemporalId equal to i.

ptf_alignment_zero_bits shall be equal to 0

The semantics of the syntax element sub_layer_level_idc [i] is, apart from the specific anon of the inference of not present values, the same as the syntax element general_ievel_idc, but apply to the sub-laser representation with TemporalId equal to i.

It should be noted that although the semantics of some syntax elements above include reference to Annex A with respect to profiles, levels, and tiers, JVET-O2001 does not define an Annex A. Examples of profiles, levels, and tiers are provided below with respect to Table 5. Further, with respect to Table 4, it should be noted that the general_constraint_info( ) syntax structure is a fixed length syntax structure essentially including a series of flags indicating respective constraints. For the sake of brevity, the general_constraint_info( ) syntax structure is not provided herein, however, reference is made to the relevant sections of JVET-O2001.

[Object 18]
As provided above, in JVET-O2001, the general level is signaled via the syntax element general_level_idc after the information about sub-profile(s). Also general_constraint_info( ) is signalled after the information about sub-profiler(s) In order for a decoder, or any other type of bitstream parser (such as an analyzer, packetizer, transcoder, extractor, rewriter) to determine the level of the Coded Video Sequence, it would be required to parse the value of num_sub_profiles and use that value to determine the location of the general_level_idc syntax element. Thus, the value of the general_level_idc can be retrieved either through processing through N 32-bit syntax elements (i.e., N instances of syntax element general_sub_profile_idc) or through jumping forward N×32 bits after parsing num_sub_profiles (where N=num_sub_profiles). Accordingly, determining die level that the Coded Video Sequence conforms to requires parsing that involves logic for conditional parsing based on the value of an earlier syntax element. Tins may be less than ideal. This disclosure describes techniques for signaling of profile, tier, level, constraint information, and sub-profile, which simplify the parsing the level information and in some examples, enable parsing the level information without parsing any conditionally present syntax elements.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites.

Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM).

Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
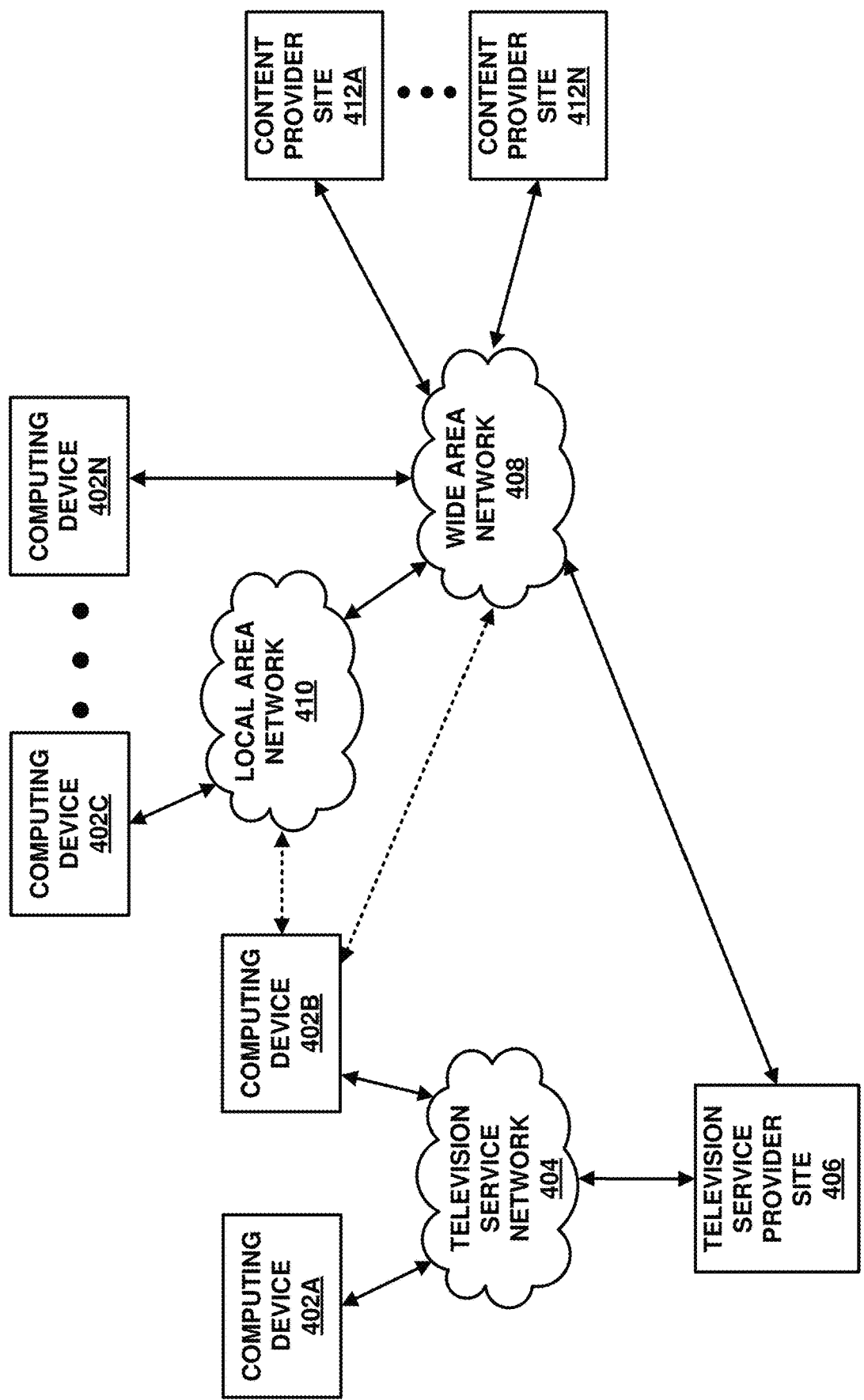
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
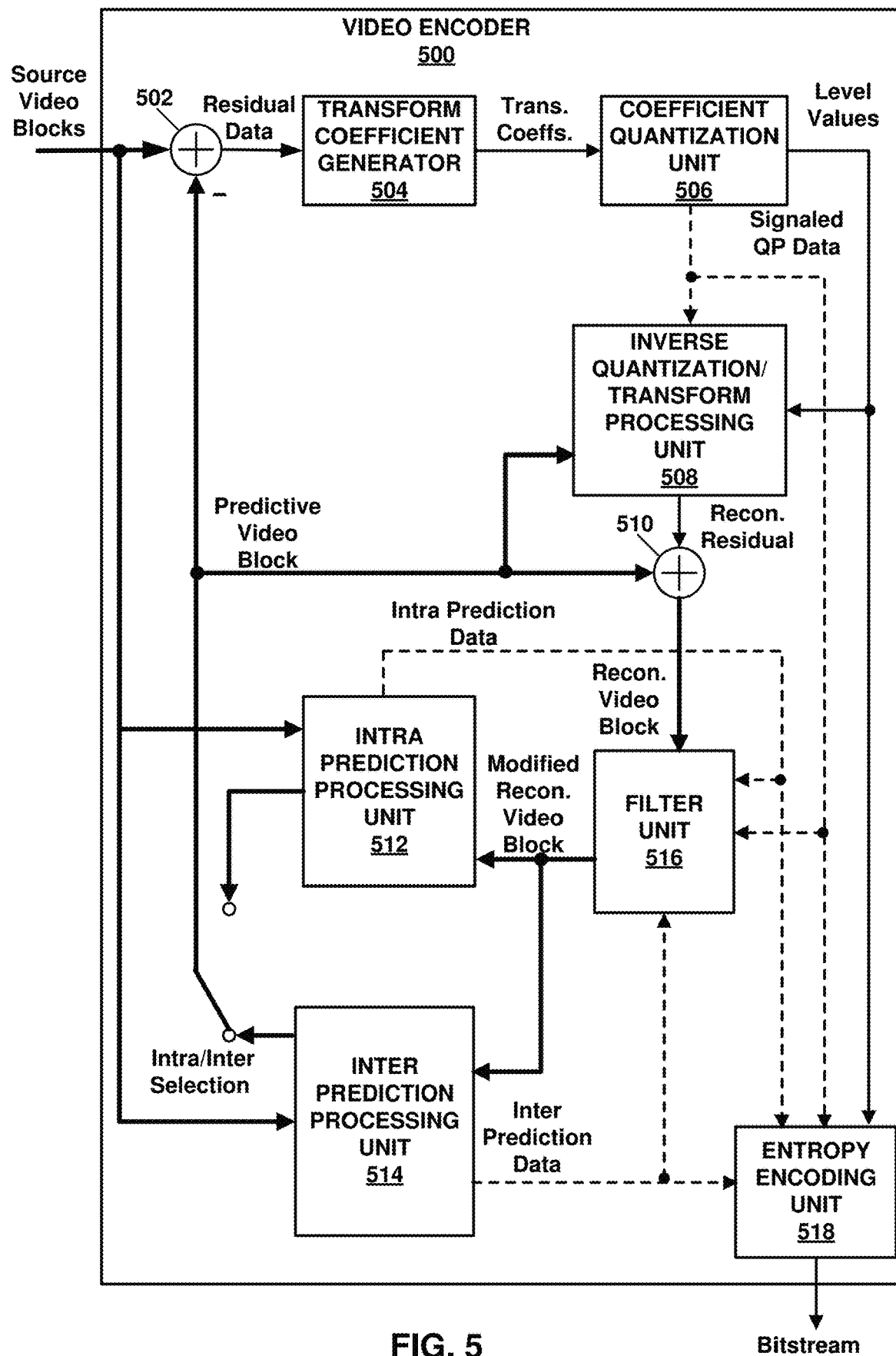
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, JVET-O2001 does not define an Annex A. Table 5 provides examples of profiles, levels, and tiers which may be used according to the techniques herein.

[Object 19]

TABLE 5

Tier and level limits for the Main and Main 10 profiles

| Level | Max luma sample rate MaxLumaSr (samples/sec) | Max bit rate MaxBR (1000 bits/s) | | Min Compression Ratio MinCr |
|---|---|---|---|---|
| | | Main tier | High tier | |
| 1 | 552 960 | 128 | — | 2 |
| 2 | 3 686 400 | 1 500 | — | 2 |
| 2.1 | 7 372 800 | 3 000 | — | 2 |
| 3 | 16 588 800 | 6 000 | — | 2 |
| 3.1 | 33 177 600 | 10 000 | — | 2 |
| 4 | 66 846 720 | 12 000 | 30 000 | 4 |
| 4.1 | 133 693 440 | 20 000 | 50 000 | 4 |
| 5 | 267 386 880 | 25 000 | 100 000 | 6 |
| 5.1 | 534 773 760 | 40 000 | 160 000 | 8 |
| 5.2 | 1 069 547 520 | 60 000 | 240 000 | 8 |
| 6 | 1 069 547 520 | 60 000 | 240 000 | 8 |
| 6.1 | 2 139 095 040 | 120 000 | 480 000 | 8 |

[Object 20]

As further described above, the signaling of the general level of a CVS tn JVET-O2001 is less than ideal. In one example, according to the techniques herein, syntax element general_level_idc is moved to precede syntax element num_sub_profile in the profile_tier_level( ) syntax structure. Table 6 and Table 7 illustrate examples where syntax element general_level_idc is moved to precede syntax element num_sub_profile in the profile_tier_level( ) syntax structure. It should lie noted that with general_level_idc preceding num_sub_profile in the syntax, the value of general_level_idc can be determined without parsing syntax elements which are conditionally present based on the value of num_sub_profile.

[Object 21]

As provided above, the general_constraint_info( ) is a fixed length syntax structure with no conditionally present syntax elements. In the example in Table 7, the general_constraint_info( ) syntax structure is also moved before the conditionally present syntax elements related to num_sub_profiles. In another example, the general_constraint_info( ) syntax structure may be placed after general_level_idc instead of before it. One benefit of moving the general_constraint_info( ) syntax structure in this manner is that general_constraint_info ( ) can be parsed without parsing syntax elements which are conditionally present based on the value of num_sub_profile.

TABLE 6

| | Descriptor |
|---|---|
| profile_tier_level( maxNumSubLayersMinus1 ) { | |
|   general_profile_idc | u(7) |
|   general_tier_flag | u(1) |
|   general_level_idc | u(8) |
|   num_sub_profiles | u(8) |
|   for( i = 0; i < num_sub_profiles; i++ ) | |
|     general_sub_profiles_idc[ i ] | u(32) |
|   general_constraint_info( ) | |
|   for( i = 0; i < maxNumSubLayersMinus1; i++ ) | |
|     sub_layer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( sub_layer_level_present_flag[ i ] ) | |
|       sub_layer_level_idc[ i ] | u(8) |
| } | |

[Object 22]

TABLE 7

| | Descriptor |
|---|---|
| profile_tier_level( maxNumSubLayersMinus1 ) { | |
|   general_profile_idc | u(7) |
|   general_tier_flag | u(1) |
|   general_constraint_info( ) | |
|   general_level_idc | u(8) |
|   num_sub_profiles | u(8) |
|   for( i = 0; i < num_sub_profiles; i++ ) | |
|     general_sub_profiles_idc[ i ] | u(32) |
|   for( i = 0; i < maxNumSubLayersMinus1; i++ ) | |
|     sub_layer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |
|     if( sub_layer_level_present_flag[ i ] ) | |
|       sub_layer_level_idc[ i ] | u(8) |
| } | |

With respect to Table 6 and Table 7, compared to JVET-O2001, the for loop for signaling general_sub_profile_idc[i] may be changed from for(i=0; i<=num_sub_profiles; i++) in JVET-O2001 to for(i=0; i<num_sub_profiles; i++). This allows a profile_tier_level structure which can signal a zero value for num_sub_profiles and in that case not include any general_sub_profile_idc[i] syntax elements. This allows specifying only the general_profile_idc, general_tier_flag, general_constraint_info( ), and general_level_idc and not specifying any sub-profile information. This may be useful when the bitstream does not cater to sub-profiles. In this case, the above change in the for loop saves bits.

[Object 23]
With respect to Table 6 and Table 7, in one example the semantics may be based on the semantics provided above with respect to Table 4. Further, in one example, the semantic s may be based on the following, where sub_layer_level_idc may be inferred:
When the profile_tier_level( ) structure is included in a DPS, the BitstreamInScope is die entire bitstream that refers to the DPS. When the profile_tier_level( ) structure is included in an SPS, the BitstreamInScope is the CVS that refers to the SPS.

general_profile_idc indicates a profile to which BitstreamInScope conforms as specified in Annex A. Bitstreams shall not contain values of general_profile_idc other than those specified in Annex A. Other values of general_profile_idc are reserved for future use by ITU-T|ISO/TEC.

general_tier_flag specifies the tier context for the interpretation of general_level_idc as specified in Annex A.

num_sub_profiles raffles specifies the number of die general_sub_profile_idc[i] syntax elements.

general_sub_profile_idc[i] indicates the i-th interoperability metadata registered as specified by X Recommendation ITU-T T.35, the contents of which are not specified in this Specification.

[Object 24]

general_level_idc indicates a level to which BitstresmInScope conforms as specified in Annex A. Bitstreams shall not contain values of general_level_idc other than those specified in Annex A. Other values of general_level_idc are reserved for future, use by ITU-T|ISO/IEC.

NOTE—A greater value of general_level_idc indicates a higher level. The maximum level signalled in the DPS for BitstreamInScope may be higher than die level signalled in the SPS for a CVS contained within BitstreamInScope.

NOTE—When BitstreamInScope conforms to multiple profiles, general_profile_idc should indicate the profile that provides the preferred decoded result or the preferred bitstream identification, as determined by the encoder (in a manner not specified in this Specification).

NOTE—When tire profile_tier_level( ) syntax structure is included in a DPS and CVSs of BitstreamInScope conform to different profiles, general_profile_idc and level_idc should indicate the profile and level for a decoder that is capable of decoding BitstreamInScope.

sub_layer_level_present_flag[i] equal to 1 specifies that level information is present in the profile_tier_level( ) syntax structure for the sub-layer representation with TemporalID equal to i. sub_layer_level_present_flag[i] equal to 0 specifies that level information is not present in foe profile_tier_level( ) syntax structure for the sub-layer representation with TemporalId equal to i.

ptl_alignment_zero_bits shall be equal to 0.

The semantics, of the syntax element sub_layer_level_idc [i] is, apart from the specification of the inference of not present values, the same as the syntax element general_level_idc, but apply to die sub-layer representation with TemporalId equal to i.

[Object 25]
For profile_tier_level( ) syntax structure included in DPS and SPS, when, not present sub_layer_level_idc[t] is inferred as follows:
sub_layer_level_idc[maxNumSubLayersMinus1] is inferred to be equal to general_level_idc of the same profile_tier_level( ) structure,
for i in the range of maxNumSubLayersMinus1−1 to 0 (in decreasing order of i values), sub_layer_level_idc [i] is inferred to be equal to sub_layer_level_idc[i+1] of the same profile_tier_level( ) structure, In another example, the above inference may be specified as follows:
When not present sub_layer_level_idc[i] is inferred as follows:
  sub_layer_level_idc[maxNumSubLayersMinus1] is infested to be equal to general_level_idc of the same profile_tier_level( ) structure.
  tor i in the range of maxNumSubLayersMinus1−1 to 0 (in decreasing order of i values), sub_layer_level_idc[i] is inferred to be equal to sub_layer_level_idc[i+1].

[Object 26]
Further, m one example, in one or more of the profile_tier_level(maxNumSubLayersMinus1) syntax structures above, the value range of syntax element num_sub_profiles may be reduced, for example, 0-4, 0-8 or 0-16, inclusive. In one example, a reduction of the value range of syntax element num_sub_profiles, according to the techniques herein, may be accomplished by introducing a semantics constraint such as; "The value of num_sub_profiles shall be in the range of 0 to 8, inclusive." In one example, it may be preferable to keeps syntax element num_sub_profiles signalled as an 8-bit value in order to keep the syntax elements byte aligned and allow for a possibility to increase the value range in a future implementations.

[Object 27]
It should be noted that when syntax, element num_snb_profiles is seduced in the case of the syntax of Table 4, although parsing general_level_idc would still require parsing or jumping by a number of 32-bit values, the reduction would reduce tire worst case length of such parsing or jumping. It should be noted th at when the value range of syntax, element num_sub_ profiles is be reduced with respect to Table 6 and Table 7, tins may ensure that the size of the syntax structure does not become too large and that syntax elements following the 32-bit values can fee accessed without requiring too much processing.

In this manner, source device 102 represents an example of a device configured to signal a syntax element indicating a profile corresponding to a coded video sequence, signal a syntax element indicating a context corresponding to the coded video sequence, and signal a syntax element indicating a level corresponding to the coded video sequence, wherein the syntax element indicating the level immediately follows the syntax element indicating the context.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
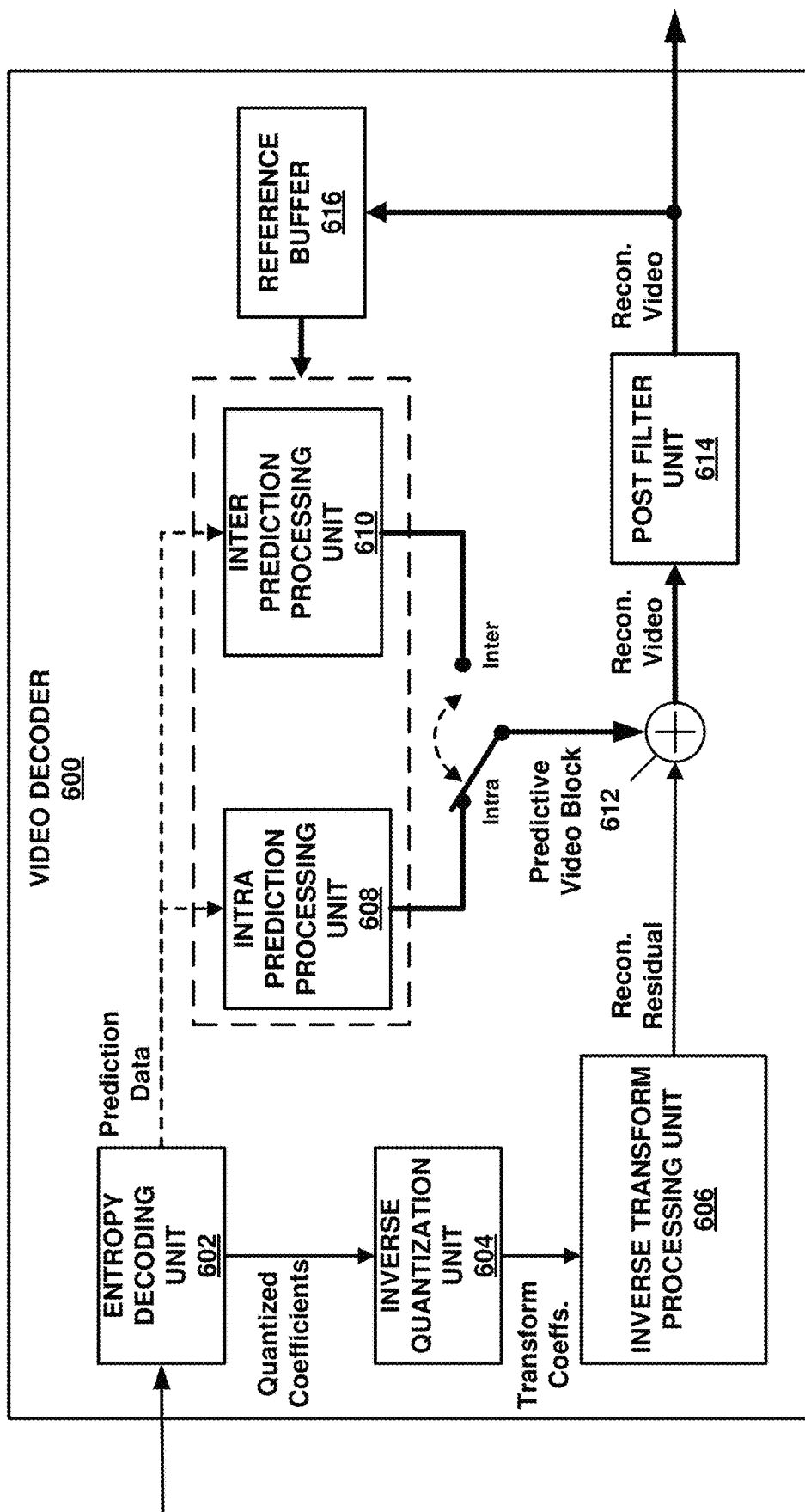
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-7. Video decoder 600 may decode a picture based on or according to the processes described above, and further based on parsed values in Tables 1-7.

In the example illustrated in FIG. 6, video decoder 600 includes an entropy decoding unit 602, inverse quantization unit 604, inverse transform processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit 604 and inverse transform processing unit 606 receives a quantization parameter, quantized coefficient values, transform data, and prediction data from entropy decoding unit 602 and outputs reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a syntax element indicating a profile corresponding to a coded video sequence, parse a syntax element indicating a context corresponding to the coded video sequence, and parse a syntax element indicating a level corresponding to the coded video sequence, wherein the syntax element indicating the level immediately follows the syntax element indicating the context.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of signaling level information for video data, the method comprising: signaling a syntax element indicating a profile corresponding to a coded video sequence; signaling a syntax element indicating a context corresponding to the coded video sequence; and signaling a syntax element indicating a level corresponding to the coded video sequence, wherein the syntax element indicating the level immediately follows the syntax element indicating the context.

In one example, a method of decoding video data, the method comprising: parsing a syntax element indicating a profile corresponding to a coded video sequence; parsing a syntax element indicating a context corresponding to the coded video sequence; and parsing a syntax element indicating a level corresponding to the coded video sequence, wherein the syntax element indicating the level immediately follows the syntax element indicating the context.

In one example, the method, wherein the syntax elements are included in a profile tier level syntax structure.

In one example, a device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus comprising means for performing any and all combinations of the steps.

In one example, a non-transitory computer-readable storage medium comprising instructions stored thereon that, when executed, cause one or more processors of a device to perform any and all combinations of the steps.

In one example, a method of signaling level information for video data, the method comprising: signaling a first syntax element indicating a profile; signaling a second syntax element indicating a context; signaling a third syntax element indicating a level; sending a profile tier level syntax structure including the first syntax element, second syntax element and third syntax element, wherein the first syntax element, the second syntax element and the third syntax element are located on a top of the profile tier level syntax structure, and wherein the third syntax element immediately follows the second syntax element.

In one example, a method of decoding video data, the method comprising: receiving a profile tier level syntax structure; parsing a first syntax element, from the profile tier level syntax structure, indicating a profile; parsing a second syntax element, from the profile tier level syntax structure, indicating a context; and parsing a third syntax element, from the profile tier level syntax structure, indicating a level, wherein the first syntax element, the second syntax element and the third syntax element are located on a top of the profile tier level syntax structure, and wherein the third syntax element immediately follows the second syntax element.

In one example, the method, further comprising: for indices in a range of 0 to a maximum number of sub-layers minus 2, determining whether or not a fourth syntax element, with an index, indicating level information for a sub-layer is present; and in a case that the fourth syntax element with an index i is not present, inferring a value of the fourth syntax element with the index i equal to a value of the fourth syntax element with an index (i+1).

In one example, a device of decoding video data, the device comprising one or more processors configured to: receive a profile tier level syntax structure; parse a first syntax element, from the profile tier level syntax structure, indicating a profile; parse a second syntax element, from the profile tier level syntax structure, indicating a context; and parse a third syntax element, from the profile tier level syntax structure, indicating a level, wherein the first syntax element, the second syntax element and the third syntax element are located on a top of the profile tier level syntax structure, and wherein the third syntax element immediately follows the second syntax element.

CROSS REFERENCE

This Nonprovisional application claims priority under 35 U.S.C. § 119 on provisional Application No. 62/897,149 on Sep. 6, 2019, the entire contents of which are hereby incorporated by reference.

The invention claimed is:

1. A method of decoding video data, the method comprising:
   receiving a profile tier level syntax structure included in a sequence parameter set;
   parsing a first syntax element, from the profile tier level syntax structure, indicating whether or not a level information for a sub-layer is present in the profile tier level syntax structure;
   determining whether or not a second syntax element with an index i is present based on the first syntax element;
   in a case that the second syntax element with the index i is present, parsing the second syntax element, from the profile tier level syntax structure, indicating the level information for the sub-layer with a sub-layer index in a range of 0 to a maximum number of sub-layers minus 2; and
   in a case that the second syntax element with the index i is not present, inferring a value of the second syntax element with the index i equal to a value of the second syntax element with an index (i+1).

2. A device of decoding video data, the device comprising one or more processors configured to:
   receive a profile tier level syntax structure included in a sequence parameter set;
   parse a first syntax element, from the profile tier level syntax structure, indicating whether or not a level information for a sub-layer is present in the profile tier level syntax structure;
   determine whether or not a second syntax element with an index i is present based on the first syntax element;
   in a case that the second syntax element with the index i is present, parse the second syntax element, from the profile tier level syntax structure, indicating the level information for the sub-layer with a sub-layer index in a range of 0 to a maximum number of sub-layers minus 2; and in a case that the second syntax element with the index i is not present, infer a value of the second syntax element with the index i equal to a value of the second syntax element with an index (i+1).

* * * * *